(12) United States Patent
Milan

(10) Patent No.: US 6,736,658 B2
(45) Date of Patent: May 18, 2004

(54) POWER SUPPLY INTERCONNECTING DEVICE

(76) Inventor: Henry Milan, 1709 Apple Ridge Ct., Rochester Hills, MI (US) 48306

( * ) Notice: Subject to any disclaimer, the term of this patent is extended or adjusted under 35 U.S.C. 154(b) by 0 days.

(21) Appl. No.: 10/454,859

(22) Filed: Jun. 5, 2003

(65) Prior Publication Data

US 2003/0207624 A1 Nov. 6, 2003

Related U.S. Application Data

(63) Continuation-in-part of application No. 09/730,030, filed on Dec. 5, 2000, now Pat. No. 6,607,408.
(60) Provisional application No. 60/386,080, filed on Jun. 5, 2002.

(51) Int. Cl.[7] .......................... H01R 25/00; H02M 1/10
(52) U.S. Cl. ...................................... 439/189; 363/146
(58) Field of Search ........................ 439/189, 956; 363/146, 142

(56) References Cited

U.S. PATENT DOCUMENTS

| | | | |
|---|---|---|---|
| 4,501,460 A | 2/1985 | Sisler | |
| 5,297,015 A * | 3/1994 | Miyazaki et al. | 363/146 |
| 5,369,565 A * | 11/1994 | Chen et al. | 363/146 |
| 5,645,434 A | 7/1997 | Leung | |
| 5,715,156 A * | 2/1998 | Yilmaz et al. | 363/142 |
| 5,838,548 A | 11/1998 | Matz et al. | |
| 5,885,109 A * | 3/1999 | Lee et al. | 439/956 |
| 6,059,614 A | 5/2000 | Shelby et al. | |
| D426,612 S | 6/2000 | Primeau, IV | |
| 6,137,686 A | 10/2000 | Saye | |
| 6,141,221 A | 10/2000 | Tong et al. | |
| 6,233,167 B1 * | 5/2001 | Chen et al. | 363/146 |
| 6,304,188 B1 | 10/2001 | Subak et al. | |
| 6,462,953 B2 | 10/2002 | Tong et al. | |
| 6,592,386 B2 * | 7/2003 | Teng et al. | 439/172 |

* cited by examiner

Primary Examiner—Renee Luebke
(74) Attorney, Agent, or Firm—MacMillan, Sobanski & Todd, LLC

(57) ABSTRACT

A modular electronic power supply interconnecting device has a plurality of stackable modules for converting an AC input voltage into DC output voltages of various magnitudes. A base module receives the input power and generates a first output power. A first adjacent module receives transfer power from the base module and generates a second output power. A second adjacent module receives transfer power from the base module and generates a third output power. The base module and the first and second adjacent modules are releasably attached and electrically connected. The device can be used to covert AC input power into DC power of 5 volts, 12 volts, 19 volts or any other desired magnitude.

20 Claims, 7 Drawing Sheets

POWER SUPPLY INTERCONNECTING DEVICE

CROSS-REFERENCE TO RELATED APPLICATION

This application is a continuation-in-part of the co-pending U.S. patent application Ser. No. 09/730,030 filed Dec. 5, 2000 now U.S. Pat. No. 6,607,408.

This application claims the benefit of U.S. provisional patent application Serial No. 60/386,080 filed Jun. 5, 2002.

BACKGROUND OF THE INVENTION

The present invention relates to power supply systems of a snap together nature, wherein low voltage, direct current power may be provided for various types of electronic devices and connections, such as USB (universal serial bus) devices, cell phones, notebook computers, FireWire devices, and the like.

More particularly, the present invention deals with a low voltage, direct current power supply system having a base stackable module and one or more (preferably two) adjacent stackable modules which are quickly and easily connected and disconnected by virtue of snap together mechanical connections and appropriate electrical connections or connectors provided on the modules.

Most particularly, the present invention deals with a modular, low voltage, direct current power supply system of the foregoing nature wherein high voltage, alternating current power is supplied to a base stackable module, which in turn provides adjacent stackable modules with either a snap together connection to a high voltage, alternating current power source, or a snap together connection to a low voltage, direct current power source, wherein each of the modules converts its incoming power into a module specific low voltage, direct current output.

Currently, electronic devices require electrical power in a variety of low voltages that presently are typically supplied by multiple power pack transformers that are plugged into electrical wall outlets or power strips. When these transformers are used with electrical wall outlet receptacles, they must be plugged-in in a particular orientation, which can result in the transformer blocking other receptacles, rendering these unusable. When these power sources are plugged into electrical power strip receptacles, the transformers can block other power strip receptacles, thereby rendering those receptacles unusable. The transformers can also interfere with the power strip's power switch, the power strip's incoming power plugs, and can even interfere with other power pack transformers, thus causing electrical problems and general clutter.

Output power cables coming from each power pack will not only add to the clutter, but can get tangled with cables of computers and peripherals, which can cause the computers and peripherals to lose their connections and result in improper functioning of those devices. Computers and peripherals that could possibly be affected in this manner are personal computers, mice, monitors, keyboards, printers, scanners, external disk drives, speakers, digital cameras, PDAs (personal digital assistants), cable modems, cell and cordless telephones, and the like.

SUMMARY OF THE INVENTION

To solve the aforementioned problems that exist in the art, the present invention provides a low voltage power supply system, and modules therefore, which are easily interconnected together. A base stackable module is first required, after which, additional stackable modules can be mechanically attached on either the top or the bottom of the base stackable module, or to another module. The base stackable module is provided with a power cable, or a plug in, connection to a high voltage, alternating current power source, such as 120 v AC, or 240 v AC, or other desired voltage. This may be the only connection for the present invention to receive external power.

In one aspect of the invention, a modular electronic power supply interconnection device having a plurality of stackable modules converts high voltage input power into one or more lower output voltages. A base stackable module includes a base input electrical connector to receive a base input power source. A base converter converts the base input electrical power from a higher voltage to a lower voltage base output power and a base output electrical connector provides the base output power to external electrical devices. A first adjacent stackable module includes an adjacent male electrical connector for electrical contact with a base female electrical connector to receive transfer power from the base stackable module. A converter in the adjacent module converts the transfer power to an adjacent output power available at an adjacent output electrical connector that provides a connection to external electrical devices. The adjacent stackable module is mechanically releasably attachable to the base stackable module. One or more additional stackable modules can be similarly electrically connected and mechanically attached to the base module and the first adjacent stackable module.

DESCRIPTION OF THE DRAWINGS

The above, as well as other advantages of the present invention, will become readily apparent to those skilled in the art from the following detailed description of a preferred embodiment when considered in the light of the accompanying drawings in which.

It is to be understood that the present invention is not limited to the details of construction and arrangement of parts illustrated in the accompanying drawings, since the present invention is capable of other embodiments, and capable of being practiced or carried out in various ways within the scope of the claims. Also, it is to he understood, that the phraseology and terminology employed herein is for the purpose of description, and not of limitation.

DESCRIPTION OF THE PREFERRED EMBODIMENT

Figure 1A:
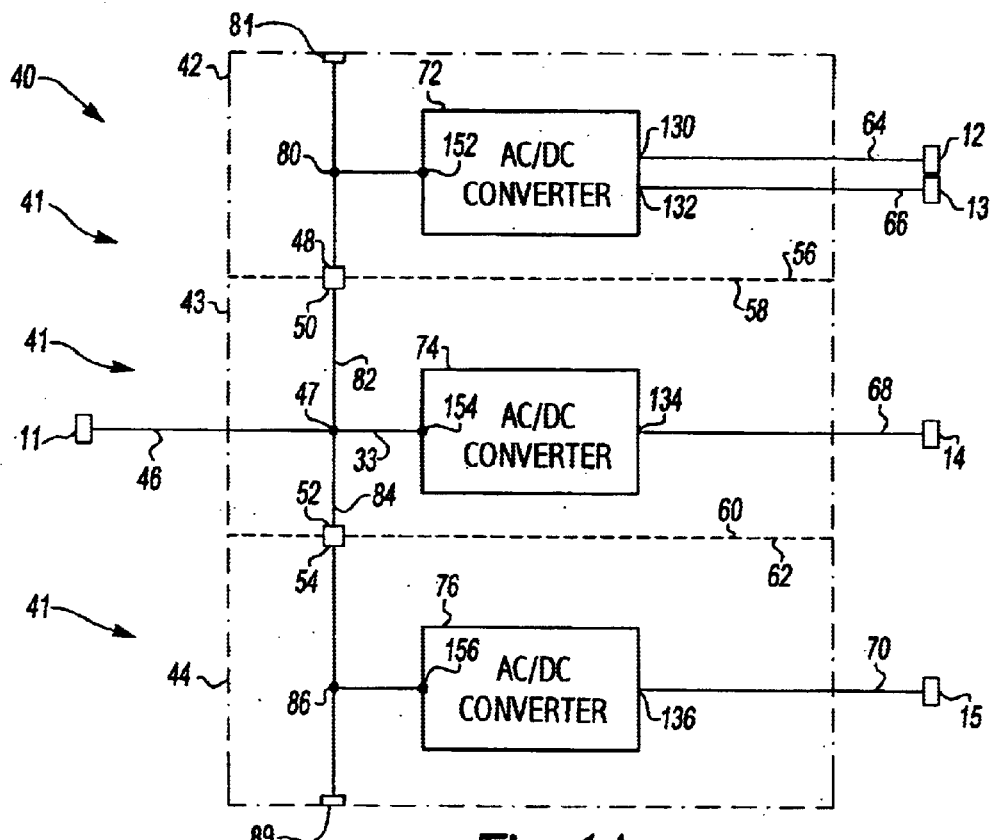
FIG. 1A is an electrical circuit block diagram of a first embodiment of a power supply interconnection device according to the present invention.

Incorporated herein by reference is the co-pending U.S. patent application Ser. No. 09/730,030, filed Dec. 5, 2000. Referring now to FIG. 1A, there is shown an electrical circuit block diagram of a first embodiment of a power supply interconnecting device 40 according to the present invention including a plurality of stackable modules 41. As used herein, the term "stackable" refers to the capability of attaching the modules together in a side-by-side relationship whether in a vertical column orientation, a horizontal row orientation, or some combination thereof. One of the stackable modules 41 is a base stackable module 43 that is provided with a base input electrical power source (high voltage, alternating current power source, such as 120 volts AC), which enters the interconnection device 40 through a first system power connector 11, and then a first system power cable 46, which may be the only connection for the first embodiment interconnecting device to receive outside power. The power is conducted internally in the base stackable module 43 to a base electrical junction 47, which directly conducts the power to a base AC to DC converter 74. To provide this power to the base converter 74, which is located in the base stackable module 43, the power is conducted through a base power input cable 83 to a base converter input port 154.

The stackable modules 41 also include a pair of adjacent stackable modules 42 and 44. Electrical power is also supplied to a first adjacent AC to DC converter 72, and a second adjacent AC to DC converter 76, which are respectively located in the first adjacent stackable module 42, and the second adjacent stackable module 44. To achieve this, the electrical power at the base electrical junction 47 is conducted through a first base transfer power output cable 82 to a first base transfer female electrical connector 50, and through a second base transfer power output cable 84 to a second base transfer female electrical connector 52.

A first adjacent transfer male electrical connector 48 on the first adjacent stackable module 42 engages the first base transfer female electrical connector 50 when the adjacent module 42 is connected onto the base stackable module 43, or vice versa, thus providing an electrical connection between the adjacent module 42 and the base module 43. The connector 48 is connected to a first adjacent electrical junction 80 connected to a converter input port 152 of the converter 72. As described in more detail below, the adjacent module 42 includes a locking means 56 that cooperates with a locking means 58 on the base module 43 to releasably attach the modules In a similar manner, the second base transfer female electrical connector 52 on the base module 43 engages a second adjacent transfer male electrical connector 54 on the second adjacent module 44 when the base module 43 is connected onto the second module 44, or vice versa, thus providing for an electrical connection between base module 43 and the second adjacent module 44. The connector 54 is connected to a second adjacent electrical junction 86 connected to a converter input port 156 of the converter 76. The base input power source is presented to the first base female electrical connector 50, and the second base female electrical connector 52 as a transfer power source, and therethrough to the first adjacent male electrical connector 48 and the second adjacent male electrical connector 54. As described in more detail below, the adjacent module 44 includes a locking means 62 that cooperates with a locking means 60 on the base module 43 to releasably attach the modules.

The first adjacent converter 72, the base converter 74, and the second adjacent converter 76 convert the high voltage, alternating current power into a respective power source (e.g. low voltage, direct current outputs), passing these outputs through first through fourth output ports 130, 132, 134, 136 respectively, resulting in these outputs being available for external electronic equipment by way of associated output cables. The first output port 130 on the converter 72 is connected by a first power output cable 64 to a corresponding first output electrical connector 12 and the second output port 132 on the converter 72 is connected by a second power output cable 66 to a corresponding second output electrical connector 13. The third output port 134 on the converter 74 is connected by a third power output cable 68 to a corresponding third output electrical connector 14. The fourth output port 136 on the converter 76 is connected by a fourth power output cable 70 to a corresponding fourth output electrical connector 15.

Also, the first adjacent stackable module 42 may include a third adjacent female electrical connector 81 for providing the transfer power to an additional adjacent stackable module (not shown) similar to the modules 42 and 44. An internal connection is made from the connector 81 to the junction 80 to provide the transfer electrical power. Additionally, the second adjacent stackable module 44 may include a fourth female adjacent electrical connector 89 for providing the transfer power to an additional adjacent module (not shown). An internal connection is made from the connector 89 to the junction 86 to provide the transfer power. The locking means described above can be employed to releasably attach the adjacent modules together.

Figure 1B:
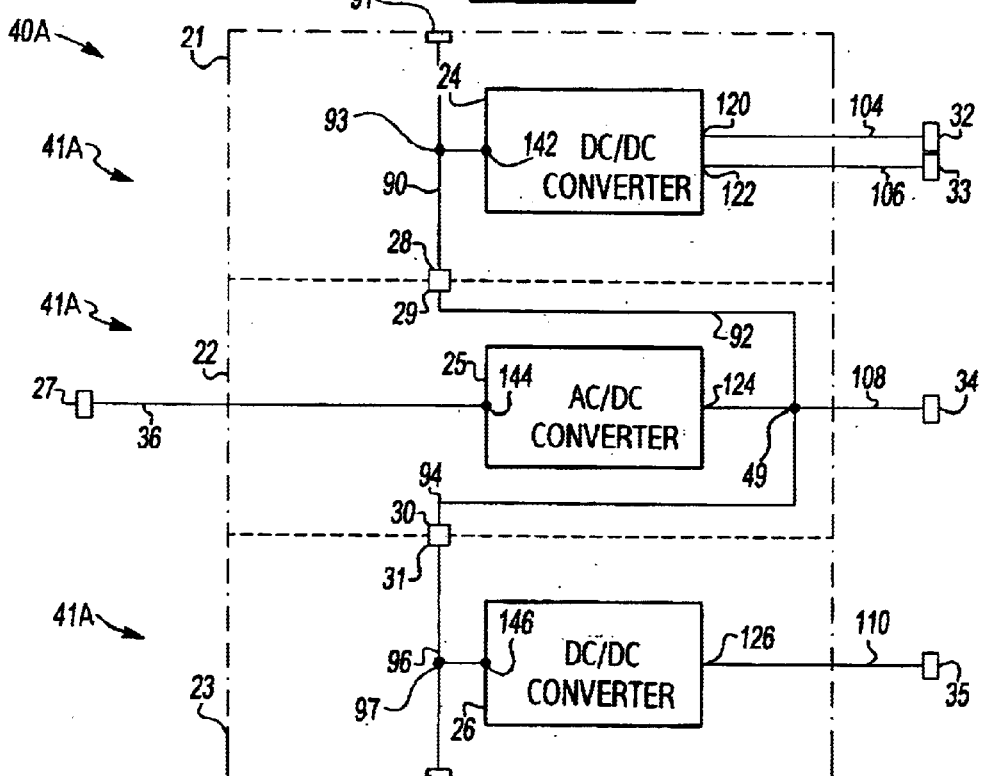
FIG. 1B is an electrical circuit block diagram of a second embodiment of the device shown in FIG. 1A.

The term "modified" is sometimes used hereinafter in connection with FIG. 1B, and other figures relating thereto, not necessarily to indicate any physical modifications to the components, although some components of the modification of the invention shown in FIG. 1B are not the same as the corresponding component in FIG. 1A, but to indicate that it is the modification of the invention shown in FIG. 1B and related figures that is being referred to.

Now referring to FIG. 1B, there is shown an electrical block diagram of a second embodiment of the device 40A according to the present invention including a plurality of stackable modules 41A. One of the stackable modules 41A is a modified base stackable module 22 that is provided with the high voltage, alternating current power source, which enters the interconnection device 40A through a second system power connector 27 connected to a second system power cable 36, which may be the only connection for the second embodiment device according to the present invention to receive outside power. The incoming power is provided directly, and only, to a modified base input port 144, and then is converted, by way of a modified base AC to DC converter 25, into the base output power source (e.g. low voltage, direct current output), which is presented at a third output port 124.

In this embodiment, the third output port is connected to a modified base electrical junction 49 as the modified transfer power source, which, in turn, transmits the modified transfer power to a modified first adjacent stackable module 21 and a modified second adjacent stackable module 23 through a modified base first power output cable 92, and a modified base second power output cable 94. The modified base first output transfer power cable 92 is electrically connected between the junction 49 and a modified first base female electrical connector 29. The modified base second output transfer power cable 94 is electrically connected between the junction 49 and a modified second base female electrical connector 30. The modified transfer power source is, thereby, presented to a modified first adjacent male connector 28 of the adjacent module 21, and a modified second adjacent male electrical connector 31 of the adjacent module 23.

Within the modified adjacent stackable modules 21, 23 the modified transfer power source is conducted through modified first and second power input cables 90 and 96 respectively connected between the connectors 28 and 31 respectively and modified first and second adjacent electrical junctions 93 and 97 respectively. The junctions 93 and 97 are connected to modified first and second adjacent converter input ports 142 and 146 respectively of modified first and second adjacent DC to DC converters 24 and 26 respectively to generate respective specific low voltage, direct current outputs at a modified first output port 120 and a modified second output port 122 of the converter 24, and a modified fourth output port 126 of the converter 26.

The first output port 120 is connected by a modified first power output cable 104 to a modified first adjacent output electrical connector 32. The modified second output port 122 is connected by a modified second output cable 106 to a modified second adjacent output electrical connector 33. The modified base output port 124 is connected by a modified base power output cable 108 to a modified base output electrical connector 34. The modified third outlet port 126 is connected by a modified third power output cable 110 to a modified third adjacent output electrical connector 35.

Also, the adjacent stackable module 21 may include a modified third adjacent female electrical connector 91 connected to the junction 93 for electrical connection to an additional adjacent stackable module (not shown). The modified second adjacent stackable module 23 may include a modified fourth female adjacent connector 99 connected to the junction 97 for electrical connection to an additional adjacent stackable module (not shown).

The circuits shown in FIGS. 1A and 1B can be combined such that the transfer power to one adjacent module is the base input electrical power (FIG. 1A) and the transfer power to the other adjacent module is the base output electrical power (FIG. 1B). Such a configuration may require two dissimilar sets of transfer connectors or different placement on the modules housings to prevent connecting one of the adjacent modules to the wrong transfer power.

Figure 1C:
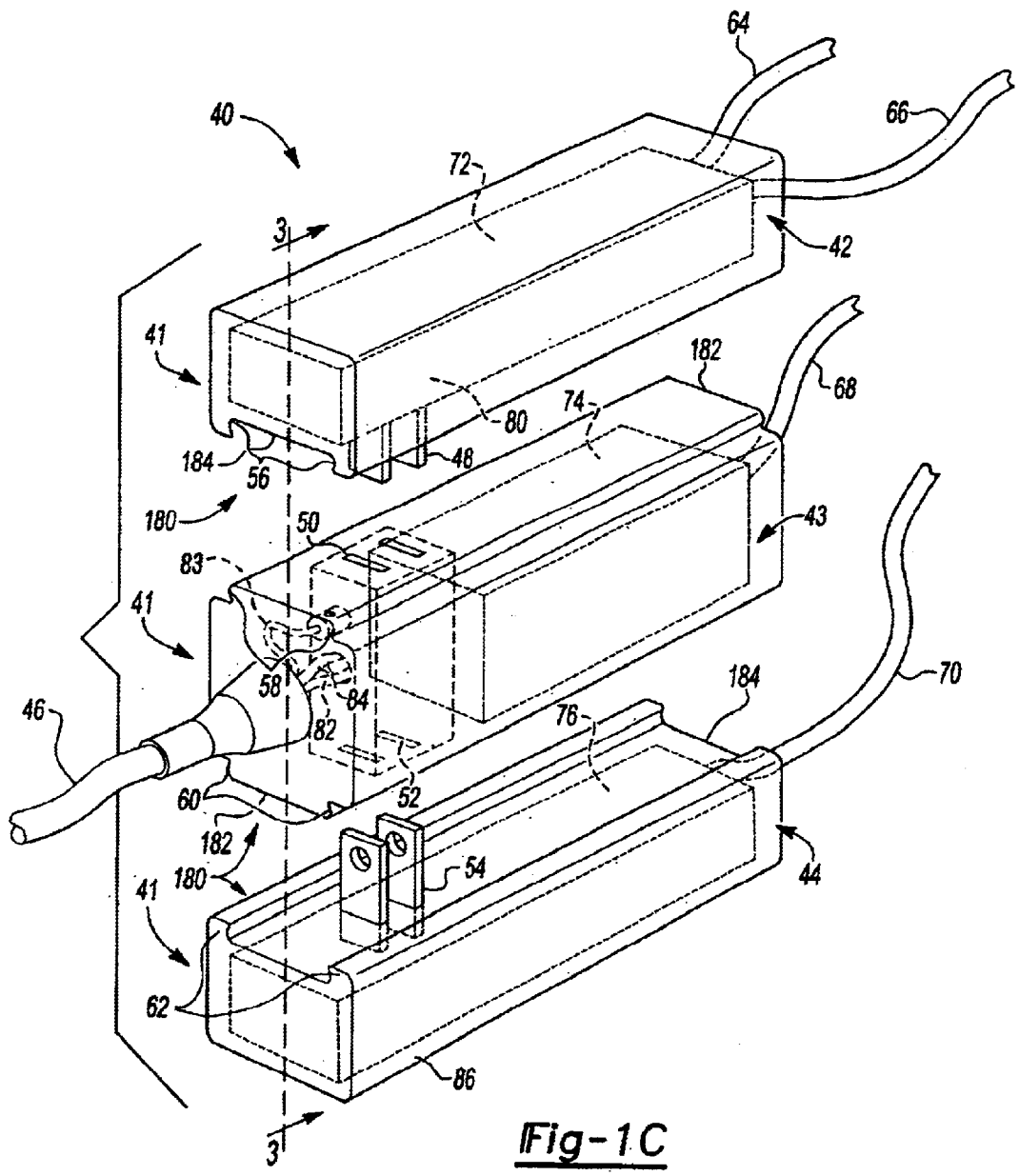
FIG. 1C is an exploded perspective view of the first embodiment device utilizing the circuit shown in FIG. 1A including a base module and two adjacent modules.

With reference to FIG. 1C, there is shown an exploded perspective view of the interconnection device 40 embodying the first embodiment according to the present invention, which may embody the circuit previously described in connection with FIG. 1A. The interconnection device 40 may include one or more of the stackable modules 41, such as the base module 43 (generating a 19 v DC output for example), the first adjacent stackable module 42 (generating a 5 v DC output for example) and the second adjacent stackable module 44 (generating a 12 v DC output for example).

The modules 41 have generally hollow housings enclosing the respective components identified in FIG. 1A. Mechanically mounted in and electrically wired internally to the base stackable module 43 and the adjacent stackable modules 42 and 44 are the base converter 74 and the first and second adjacent converters 72 and 76, respectively. The base stackable module 43 receives high voltage, alternating current power through the first system power cable 46, which power is delivered to the adjacent stackable modules 42 and 44 through the cables 82 and 83 respectively, the female connectors 50 and 52 respectively and the male connectors 48 and 54 respectively. Thus, for example, the converter 74 can provide 19 v DC power at the cable 68, the converter 72 can provide 5 v DC power at the cables 64 and 66 and the converter 76 can provide 12 v DC power at the cable 70. Depending upon the choice of converter, different voltages can be generated on the cables 64 and 66. These output voltages are for identified for illustration purposes only and any suitable output voltages can be generated from the modules 41.

Figure 1D:
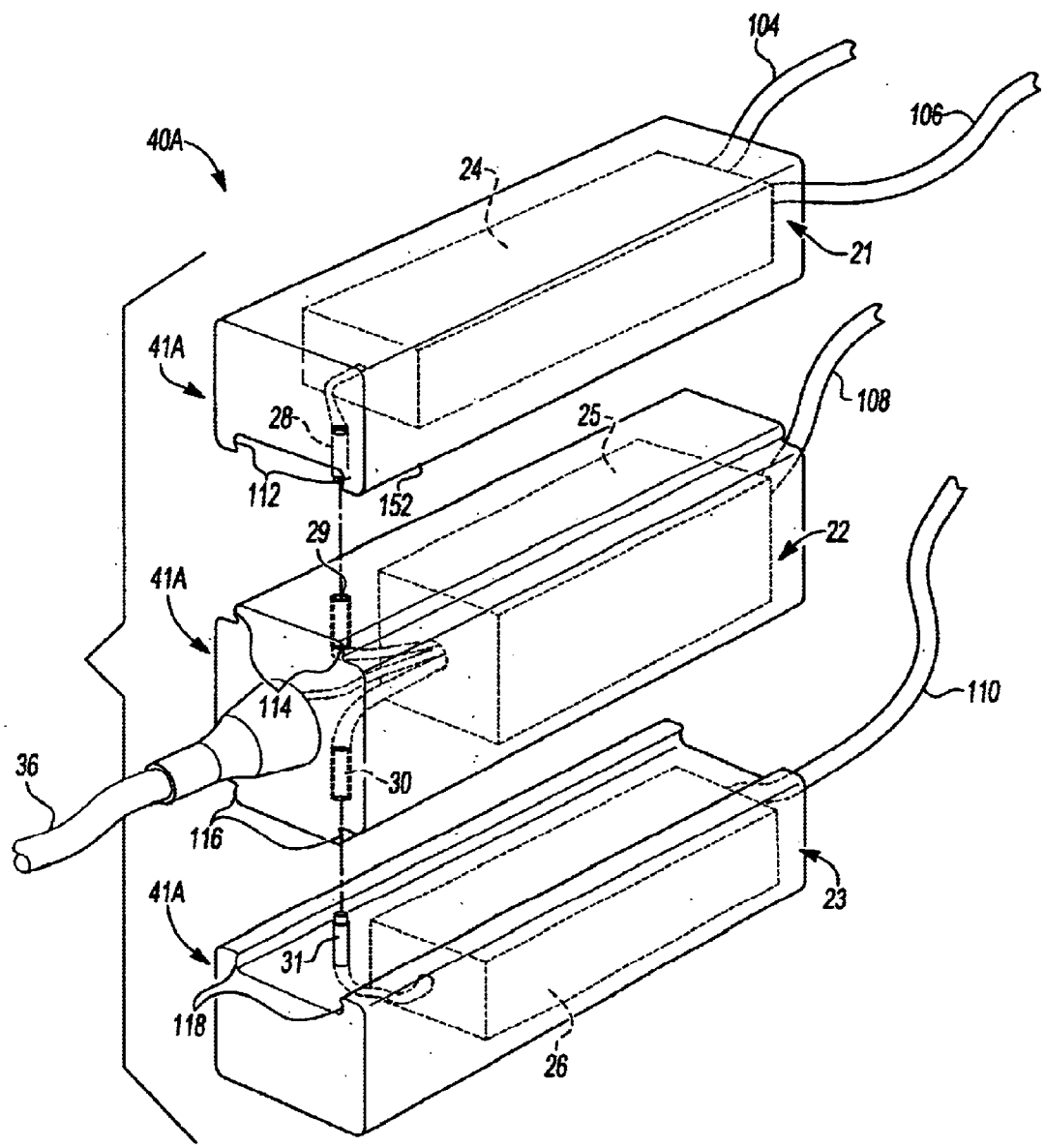
FIG. 1D is an exploded perspective view of the second embodiment device utilizing the circuit shown in FIG. 1B including a base module and two adjacent modules.

With reference to FIG. 1D, there is shown an exploded perspective view of the interconnection device 40A embodying the second embodiment according to the present invention, which may embody the circuit previously described in connection with FIG. 1B. The interconnection device 40A may include one or more of the stackable modules 41A, such as the base module 22 (generating a 19 v DC output for example), the first adjacent stackable module 21 (generating a 5 v DC output for example) and the second adjacent stackable module 23 (generating a 12 v DC output for example).

The modules 41A have generally hollow housings enclosing the respective components identified in FIG. 1B. Mechanically mounted in and electrically wired internally to the base stackable module 22 and the adjacent stackable modules 21 and 23 are the base converter 25 and the first and second adjacent converters 24 and 26, respectively. The base stackable module 22 receives high voltage, alternating current power through the first system power cable 36, which power is delivered to the adjacent stackable modules 21 and 23 through the cables female connectors 29 and 30 respectively and the male connectors 28 and 31 respectively. Thus, for example, the converter 25 can provide 19 v DC power at the cable 108, the converter 24 can provide 5 v DC power at the cables 104 and 106 and the converter 26 can provide 12 v DC power at the cable 110. Depending upon the choice of converter, different voltages can be generated on the cables 104 and 106. These output voltages are for identified for illustration purposes only and any suitable output voltages can be generated from the modules 41A.

Figure 2:
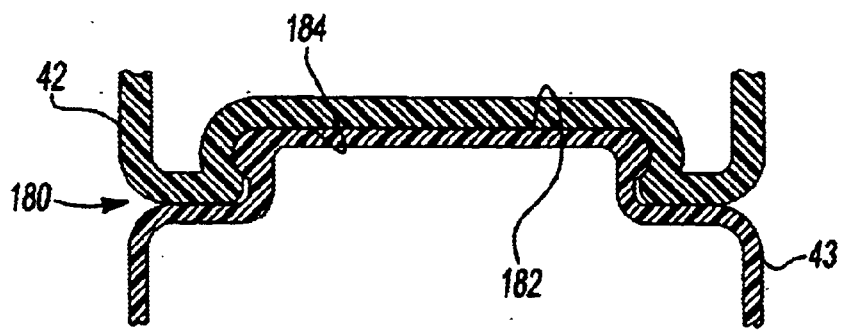
FIG. 2 is a fragmentary cross-sectional view of the connection between an adjacent module and a base module, as shown in FIG. 1C, when assembled.
Figure 3:
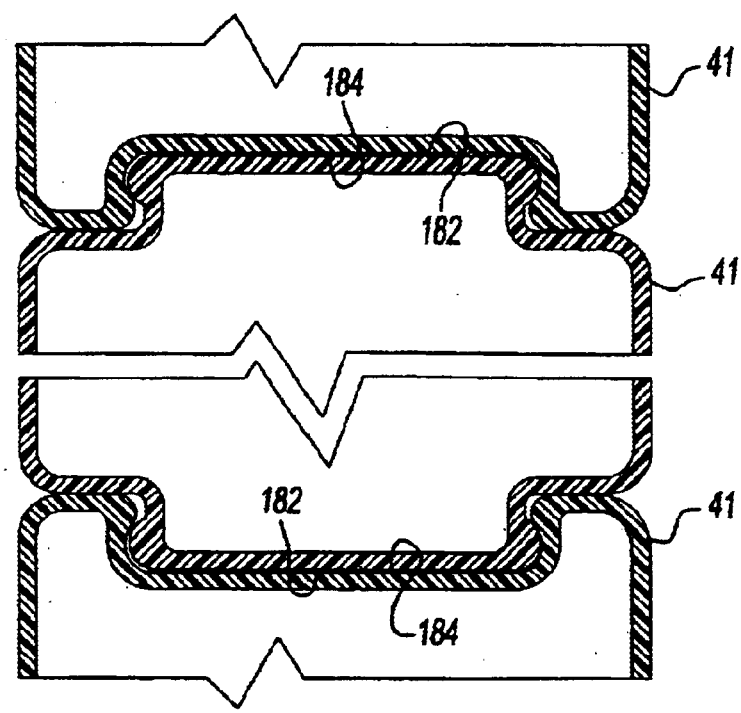
FIG. 3 is a fragmentary cross-sectional view of the connection between a base module and two adjacent modules, as shown in FIG. 1C, when assembled.

Referring now to FIGS. 1C, 2 and 3, there is illustrated one of the many interconnecting device locking means which may be used to connect the stackable modules of the present invention. The type of interconnection device connection, which is illustrated in FIGS. 2 and 3, may be referred to as a tongue and groove snap-lock connection 180. The tongue and groove snap-lock connection 180 illustrated comprises a tongue 182 provided for on all or part of the length of one side, or two or more sides, of one of the modules 41 (such as the base stackable module 43) and a complimentary groove 184 provided on at least a portion of a side of another one of the modules 41 (such as the adjacent stackable modules 42 and 44). The tongues 182 of FIG. 2 correspond to the locking means 58 and 60 of FIG. 1A and the grooves 184 correspond to the locking means 56 and 62. Similar locking means are shown in FIG. 1D as tongues 116 and cooperating grooves 118.

The dimensions of the tongues 116 and 182 and the grooves 118 and 184 are chosen so that they will fit together as desired, whether an interference condition uses a snap-fit, a press-fit, a sliding fit, or other type fit as desired. In the preferred embodiment, a fit is desired that does not take too much effort to "snap" two modules together. At the same time, the fit should not be so loose that a slight "bump" could dislodge the modules, and cause a loss of power. If a sliding type of electrical connector were being used, a sliding fit could be used which may be looser than normally desired, if, when the electrical connectors were connected, they provided some resistance to the separation of the modules.

Also, the electrical engagement between the first and second adjacent male electrical connectors 48 and 54 and the associated first and second base female electrical connectors 50 and 52, respectively, or the electrical engagement between the modified first and second adjacent male electrical connectors 28 and 31 and the modified first and second base female electrical connectors 29 and 30, respectively, may be sufficient (depending on the type of connector) to mechanically attach stackable modules without other mechanical means.

Figure 4:
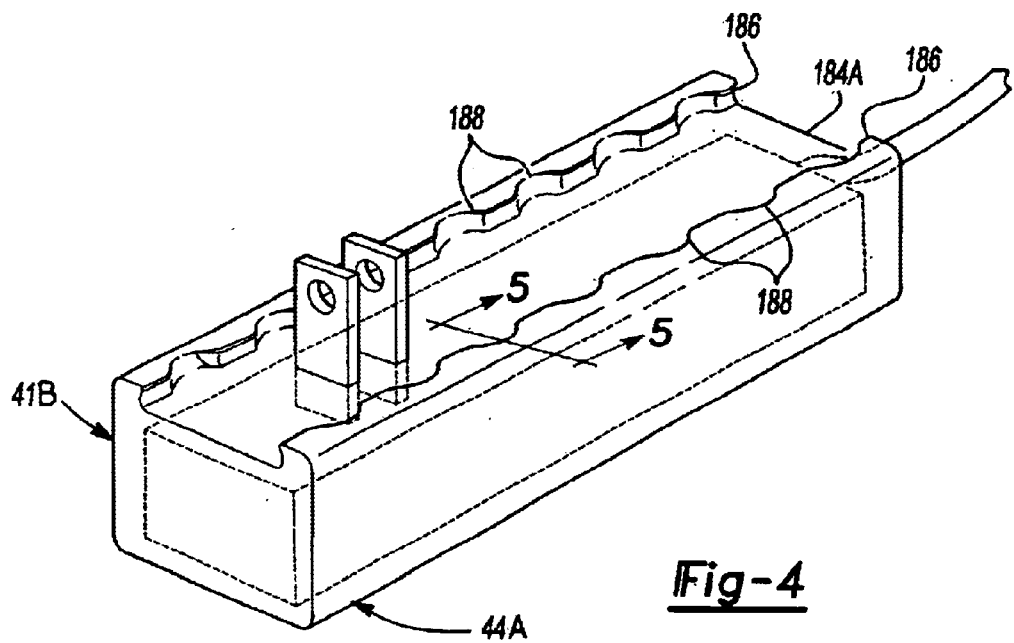
FIG. 4 is a perspective view of a modification of one of the adjacent modules shown in FIG. 1C.
Figure 5:
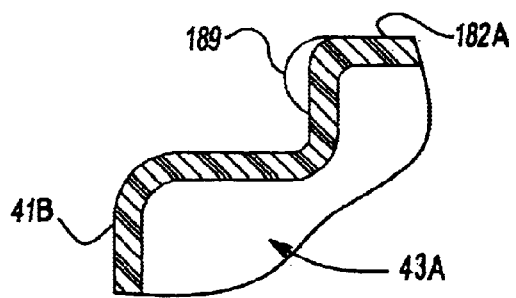
FIG. 5 is a fragmentary cross-sectional view along the section line 5—5 of FIG. 4.

Referring now to FIGS. 4 and 5, a modification of the tongue and groove construction illustrated in FIGS. 2 and 3 is shown. In FIG. 4, a module 41B is shown, such as an adjacent stackable module 44A, having a groove 184A formed in a side thereof. Unlike the groove 184 illustrated in FIGS. 2 and 3, the groove 184A has serrations or scallops 188 provided in one or both of groove edges 186. In FIG. 5, a tongue 182A is shown formed on a side of a module 43A and has projections 189 that cooperate with the serrations 188 to function as the snap-fit locking means.

Figure 6:
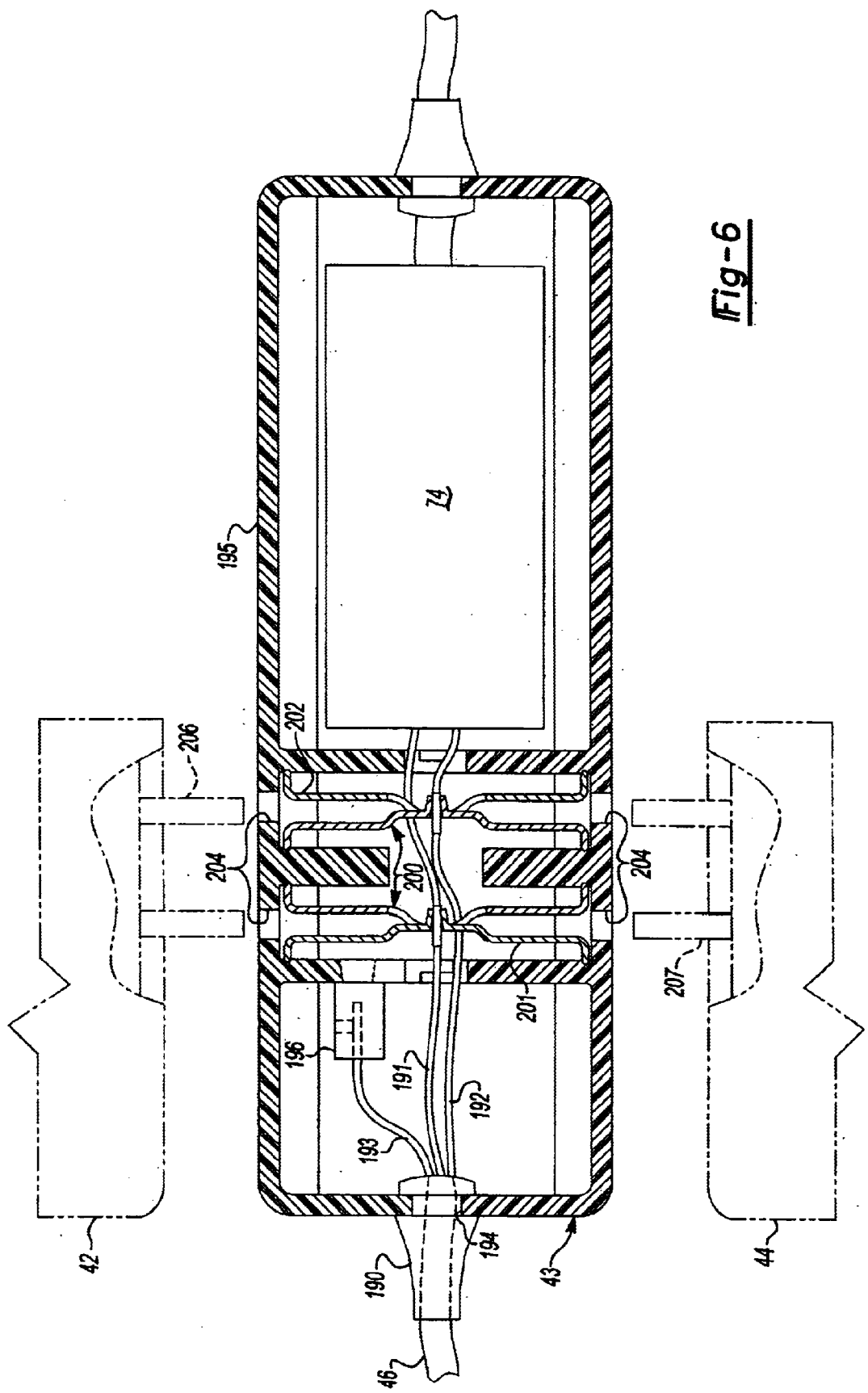
FIG. 6 is a cross-sectional elevation view of the base module shown in FIG. 1C.

Referring now to FIG. 6, there is shown a construction embodying at least a portion of the circuitry shown in FIG. 1A. The base stackable module 43 is connected to a source of power by the first system power cable 46 that is secured to a module housing 195 by a grommet 190 and/or other suitable securing means known in the electrical art retained in an aperture 194 in a wall of the housing. The cable 46 has a live conductor 191, a neutral conductor 192, and an earth or ground conductor 193, which conductors pass through the grommet 190 and the aperture 194. The ground conductor 193 is connected to a housing internal ground 196. Molded in place during the manufacturing operation, or otherwise provided as known in the electrical arts, are a pair of receptors 200, which may comprise a live female receptor 201 and a neutral female receptor 202. The live conductor 191 is electrically connected to the live female receptor 201, and the neutral conductor 192 is electrically connected to the neutral female receptor 202.

A plurality of apertures 204 are provided in the base stackable module housing 195 proximate the receptors 200. This permits prongs 206 of the connector 48 mounted to the stackable module 42 to be electrically connected to the receptors 200, and supply 120 volts AC, 240 volts AC, or other desired high voltage to the at least one adjacent stackable module 42 for further processing in accordance with the circuit of FIG. 1A. Similarly, prongs 207 of the connector 54 mounted to the module 44 may pass through the apertures 204 and electrically connect to the receptors 200 to provide electrical power to the adjacent stackable module 44.

Figure 7:
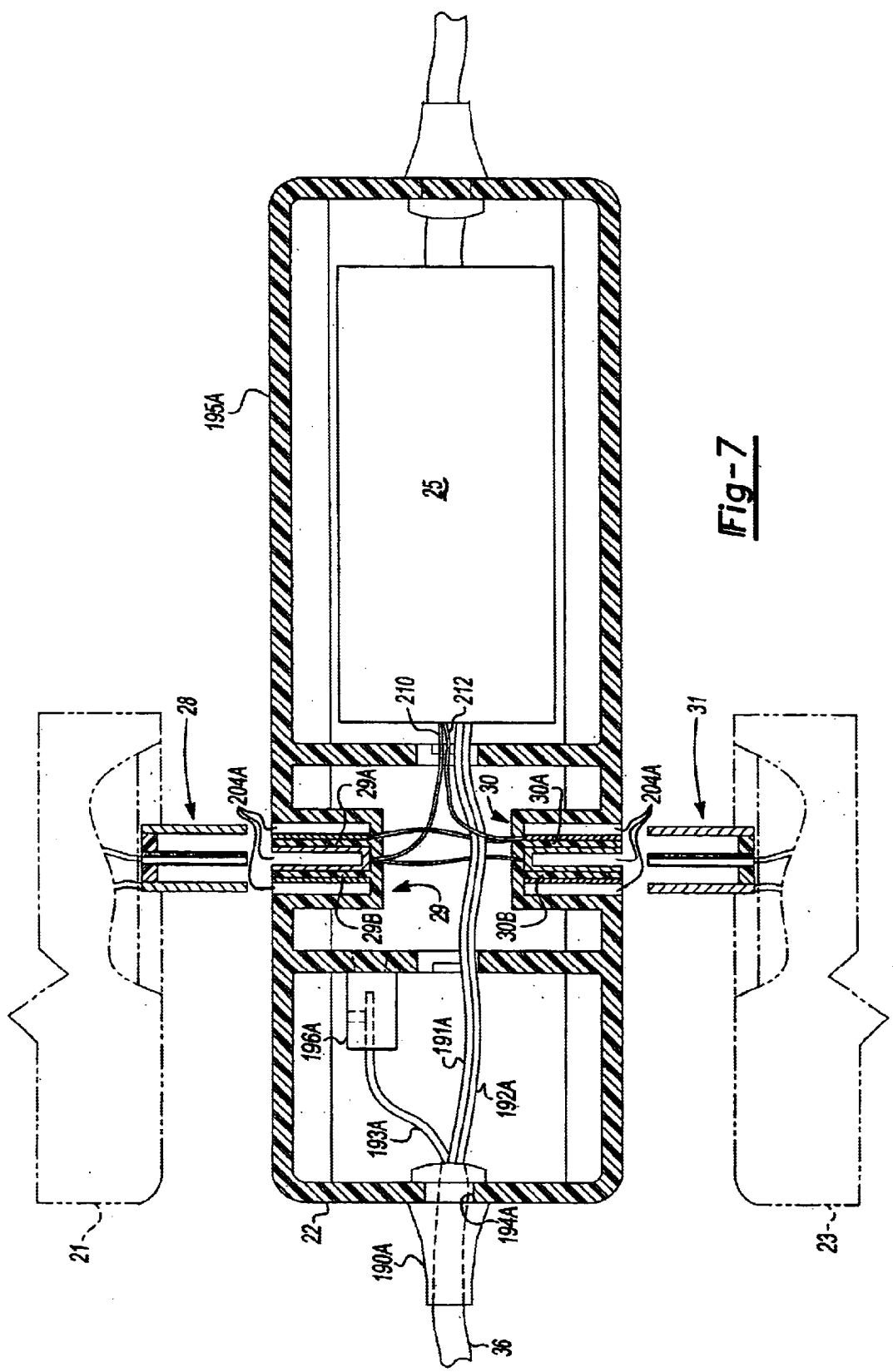
FIG. 7 is a cross-sectional elevation view of the base module shown in FIG. 1D.

Referring now to FIG. 7, there is shown a construction embodying at least a portion of the circuitry shown in FIG. 1B. The modified base stackable module 22 is connected to a source of power by the second system power cable 36 that is secured a module housing 195A by a grommet 190A and/or other suitable securing means known in the electrical art retained in an aperture 194A in a wall of the housing. The cable 36 has a live conductor 191A, a neutral conductor 192A, and earth or ground conductor 193A which pass through the grommet 190A and the aperture 194A. The ground conductor 193A is connected to a modified housing ground 196A. The live conductor 191A and neutral conductor 192A are electrically connected to the modified base converter 25. The modified base converter 25 will have the necessary electrical components to change the high incoming voltage from the live and neutral conductors 191A and 192A respectively, to a predetermined, desired low voltage, such as 19 volts DC.

Molded in place during the manufacturing of the modified base stackable module housing 195A, or otherwise provided, as known in the electrical arts, is the modified first base female electrical connector 29, and the modified second base female electrical connector 30. The connectors 29 and 30 comprise an inner electrical conductor 29A and 30A and an outer electrical conductor 29B and 30B respectively separated by suitable insulating material, which may be such as the material used for the manufacture of the modified base stackable housing 195A, or other suitable insulating material known in the art. A DC+ conductor 210 is electrically connected to the inner electrical conductors 29A and 30A and a DC-conductor 212 is electrically connected to the outer electrical conductors 29B 30 and 30B.

A plurality of modified apertures 204A are provided in the modified base stackable module housing 195A proximate the modified first base female electrical connector 29 and the modified second base female electrical connector 30. This permits the modified first adjacent male electrical connector 28 provided on the modified at least one adjacent stackable module 21, and the modified second adjacent male electrical connector 31 provided on the modified second adjacent stackable module 23, to be electrically connected to the modified first or second base female electrical connector 29 and 30 respectively for further processing in accordance with the circuit of FIG. 1B.

The converters 24, 25, 26, 72, 74 and 76 are commercially available units. The converters 25, 72, 74 and 76 typically use a transformer and full wave bridge to reduce the magnitude of the relatively high volt AC input power and convert it to DC power. The converters 24 and 26 can use an integrated circuit such as an LM2670S chip to reduce the magnitude of the DC power.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A modular electronic power supply interconnecting device comprising:

a base module having a system power connector for receiving base input electrical power of a first predetermined magnitude from a base input power source, a base converter having a base input port connected to said system power connector and a base output port, said base converter converting said base input electrical power into a base output electrical power of a second predetermined magnitude at said base output port, a base output electrical connector connected to said base output port for providing said base output electrical power to external electrical devices, a base transfer connector connected to one of said base input port and said base output port, and a base locking means;

at least one adjacent module having an adjacent transfer connector for receiving transfer electrical power from said base module, an adjacent converter having an adjacent input port connected to said adjacent transfer connector and an adjacent output port, said adjacent converter converting said transfer electrical power into an adjacent output electrical power of a third predetermined magnitude at said adjacent output port, an adjacent output electrical connector connected to said adjacent output port for providing said adjacent output electrical power to external electrical devices, and an adjacent locking means; and whereby when said adjacent locking means is releasably engaged with said base locking means, said adjacent transfer connector is electrically connected to said base transfer connector to generate said transfer electrical power as one of said base input electrical power and said base output electrical power.

2. The device according to claim 1 wherein said base transfer connector and said base locking means are a female electrical connector and wherein said adjacent transfer connector and said adjacent locking means are a male electrical connector.

3. The device according to claim 1 wherein said at least one adjacent module includes at least one additional adjacent output electrical connector connected to said adjacent output port.

4. The device according to claim 1 wherein said at least one adjacent module includes at least one additional adjacent transfer connector connected to said adjacent input port for providing said transfer electrical power to another adjacent module.

5. The device according to claim 1 wherein said base input electrical power is AC power, said base output electrical power is DC power and said base converter is an AC to DC converter.

6. The device according to claim 1 wherein said transfer electrical power is AC power, said adjacent output electrical power is DC power and said adjacent converter is an AC to DC converter.

7. The device according to claim 1 wherein said transfer electrical power is DC power, said adjacent output electrical power is DC power and said adjacent converter is a DC to DC converter.

8. The device according to claim 1 wherein said base locking means is a tongue formed on a housing of said base module and said adjacent locking means is a complementary groove formed on a housing of said adjacent module.

9. The device according to claim 8 wherein said groove has a plurality of serrations formed in a wall thereof and said tongue has a plurality of projections formed thereon for engaging said serrations.

10. The device according to claim 1 wherein said base converter generates said base output electrical power as 19 v DC power.

11. The device according to claim 1 wherein said adjacent converter generates said adjacent output electrical power as one of 12 v DC power and 5 v DC power.

12. A modular electronic power supply interconnecting device comprising:
a base module having a system power connector for receiving base input electrical power of a first predetermined magnitude from a base input power source, a base converter having a base input port connected to said system power connector and a base output port, said base converter converting said base input electrical power into a base output electrical power of a second predetermined magnitude at said base output port, a base output electrical connector connected to said base output port for providing said base output electrical power to external electrical devices, a first base transfer connector connected to one of said base input port and said base output port, a second base transfer connector connected to one of said base input port and said base output port, and a base locking means;

a first adjacent module having a first adjacent transfer connector for receiving first transfer electrical power from said base module, a first adjacent converter having a first adjacent input port connected to said first adjacent transfer connector and a first adjacent output port, said first adjacent converter converting said first transfer electrical power into a first adjacent output electrical power of a third predetermined magnitude at said first adjacent output port, an adjacent output electrical connector connected to said first adjacent output port for providing said first adjacent output electrical power to external electrical devices, and a first adjacent locking means;

a second adjacent module having a second adjacent transfer connector for receiving second transfer electrical power from said base module, a second adjacent converter having a second adjacent input port connected to said second adjacent transfer connector and a second adjacent output port, said second adjacent converter converting said second transfer electrical power into a second adjacent output electrical power of a fourth predetermined magnitude at said second adjacent output port, a second adjacent output electrical connector connected to said second adjacent output port for providing said second adjacent output electrical power to external electrical devices, and a second adjacent locking means; and whereby when said first and second adjacent locking means are releasably engaged with said base locking means, said first and second adjacent transfer connectors are electrically connected to said first and second base transfer connectors respectively to generate each of said first transfer electrical power and said second transfer electrical power as one of said base input electrical power and said base output electrical power.

13. The device according to claim 12 wherein at least one of said first and second adjacent modules includes an additional adjacent transfer connector and an additional adjacent locking means for releasably attaching and electrically connecting an additional adjacent module.

14. A modular electronic power supply interconnecting device comprising:
a base module having a system power connector for receiving base input electrical power of a first predetermined magnitude from a base input power source, a base converter having a base input port connected to said system power connector and a base output port, said base converter converting said base input electrical power into a base output electrical power of a second predetermined magnitude at said base output port, a base output electrical connector connected to said base output port for providing said base output electrical power to external electrical devices, a first base transfer connector connected to one of said base input port and said base output port, a second base transfer connector connected to one of said base input port and said base output port, and first and second base locking means;

a first adjacent module having a first adjacent transfer connector electrically connected to said first base transfer connector for receiving first transfer electrical power from said base module, a first adjacent converter having a first adjacent input port connected to said first adjacent transfer connector and a first adjacent output port, said first adjacent converter converting said first transfer electrical power into a first adjacent output electrical power of a third predetermined magnitude at said first adjacent output port, a first adjacent output electrical connector connected to said first adjacent output port for providing said first adjacent output electrical power to external electrical devices, and a first adjacent locking means releasably engaged with said first base locking means; and a second adjacent module having a second adjacent transfer connector electrically connected to said second base transfer connector for receiving second transfer electrical power from said base module, a second adjacent converter having a second adjacent input port connected to said second adjacent transfer connector and a second adjacent output port, said second adjacent converter converting said second transfer electrical power into a second adjacent output electrical power of a fourth predetermined magnitude at said second adjacent output port, a second adjacent output electrical connector connected to said second adjacent output port for providing said second adjacent output electrical power to external electrical devices, and a second adjacent locking means releasably engaged with said second base locking means.

15. The device according to claim 14 wherein said base input electrical power is AC power, said base output electrical power is DC power and said base converter is an AC to DC converter.

16. The device according to claim 14 wherein said first and second transfer electrical powers are AC power, said first and second adjacent output electrical powers are DC powers and said first and adjacent converters are each an AC to DC converter.

17. The device according to claim 14 wherein said first and second transfer electrical powers are DC power, said first and second adjacent output electrical powers are DC powers and said first and adjacent converters are each a DC to DC converter.

18. The device according to claim 14 wherein said first and second base locking means are each a tongue formed on a housing of said base module and said first and second adjacent locking means are each a complementary groove formed on a housing of said first and second adjacent modules respectively.

19. The device according to claim 14 wherein said base converter generates said base output electrical power as 19 v DC power.

20. The device according to claim 14 wherein said first adjacent converter generates said first adjacent output electrical power as 12 v DC power and said second adjacent converter generates said second adjacent output electrical power as 5 v DC power.

* * * * *